United States Patent [19]

Khalil

[11] Patent Number: 5,119,089
[45] Date of Patent: Jun. 2, 1992

[54] DOWNHOLE SEISMIC SENSOR CABLE

[76] Inventor: Hanna Khalil, Halliburton Geophysical Ser., Inc., 2135 Hwy. 6-South, HGS/HLS Bldg., Houston, Tex. 77077

[21] Appl. No.: 658,290

[22] Filed: Feb. 20, 1991

[51] Int. Cl.⁵ ............................................ G01V 1/00
[52] U.S. Cl. ............................ 340/855.2; 367/57; 367/81; 73/151; 73/152; 175/40; 181/102
[58] Field of Search .................. 367/81, 177, 57; 175/40, 50; 73/151, 152; 340/853, 856, 857; 181/101, 102, 105, 108, 112

[56] References Cited

U.S. PATENT DOCUMENTS

| | | | |
|---|---|---|---|
| 3,434,104 | 3/1969 | Stapleton et al. | 367/154 |
| 3,480,907 | 11/1969 | King | 367/154 |
| 3,518,677 | 6/1970 | Florian | 367/154 |
| 3,696,329 | 10/1972 | Hazelhurst | 367/154 |
| 4,263,473 | 4/1981 | Rocton | 174/705 |
| 4,491,939 | 1/1985 | Carpenter | 367/20 |
| 4,510,588 | 4/1985 | Kruka et al. | 367/165 |
| 4,554,650 | 11/1985 | Brown et al. | 367/154 |
| 4,693,335 | 9/1987 | Almon | 73/151 |
| 4,767,173 | 8/1988 | Priaroggia | 350/96.20 |
| 4,809,243 | 2/1989 | Bledsoe et al. | 367/154 |
| 4,837,751 | 6/1989 | Kruka et al. | 367/154 |
| 4,920,523 | 4/1990 | Kruka et al. | 367/188 |

Primary Examiner—J. W. Eldred

[57] ABSTRACT

A metallic down hole seismic sensor cable for operating at temperatures up to about 400° F. and pressures up to about 5000 psig is provided. The seismic sensor cable includes a flexible metallic conduit sized for receiving a seismic sensor, and means for transmitting output generated by the seismic sensor. The cable is preferably constructed of stainless steel. An inert curable heat resistant material substantially fills the unoccupied spaces of the assembled seismic sensor cable.

20 Claims, 3 Drawing Sheets

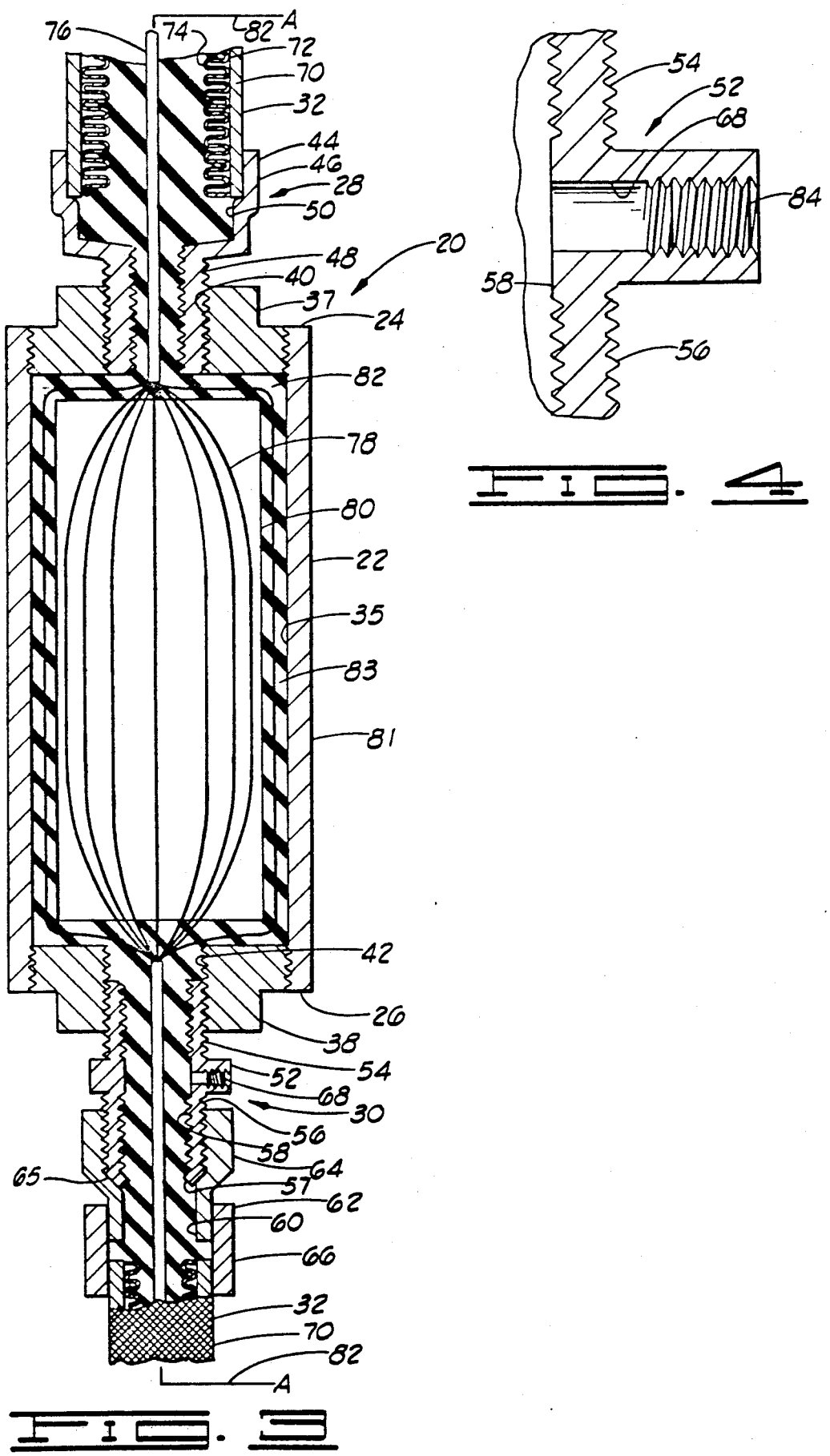

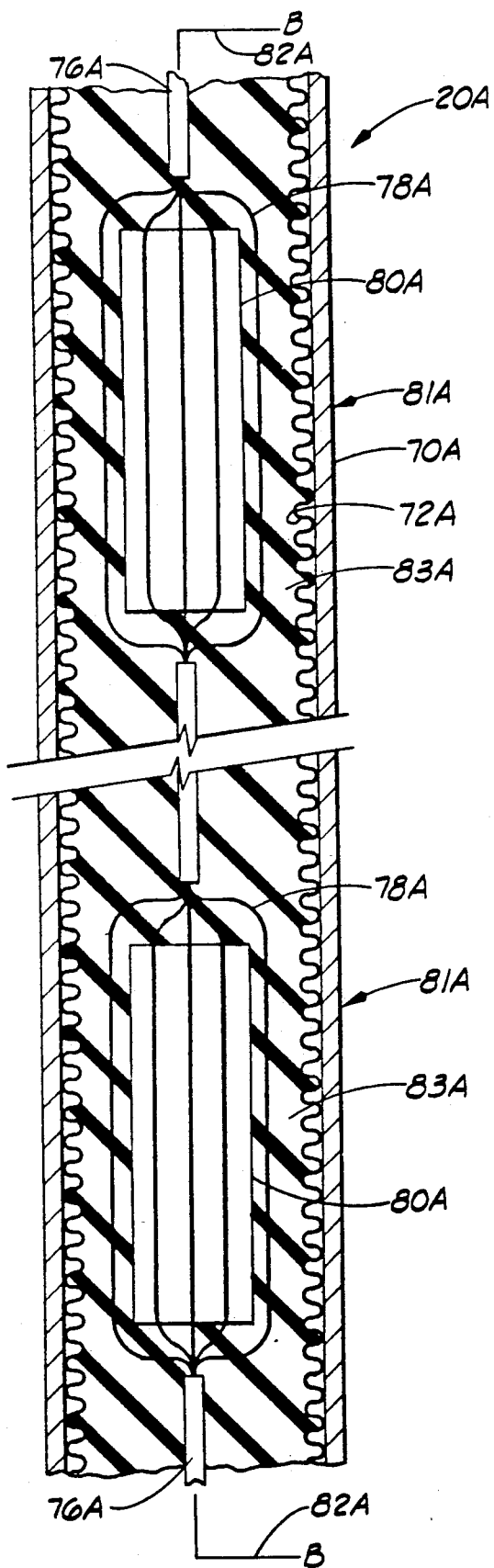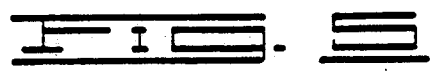

DOWNHOLE SEISMIC SENSOR CABLE

FIELD OF THE INVENTION

The present invention relates to seismic sensor cables and more particularly to robust downhole seismic sensor cables for operating at temperatures up to about 400° F. and pressures up to about 5000 psig.

BACKGROUND OF THE INVENTION

There are many different applications in which seismic sensors are placed below the earth's surface, down a well or other borehole. In many instances, the downhole temperatures exceed 200° F. Generally, these conditions exceed the temperature tolerance of conventional polyurethane-jacked seismic sensor cables. Additionally, seismic sensors for placement downhole may by subjected to rough and/or abrasive treatment and chemical attack from fluids either preexisting or introduced into the downhole environment. Thus, there exist a need for a robust seismic sensor cable suitable of withstanding these and other harsh downhole conditions.

SUMMARY OF THE INVENTION

Accordingly, it is the general purpose and object of the present invention to provide a robust seismic sensor cable capable of operating at temperatures up to about 400° F. and pressures up to about 5000 psig. The present invention relates to a metallic downhole seismic sensor cable having an internal bore with portions of said internal bore sized for receiving a seismic sensor, and a transmitting means for transmitting output generated by a seismic sensor positioned within said sized internal bore. The metal construction of the present invention provides superior resistance to most downhole conditions.

BRIEF DESCRIPTION OF THE DRAWINGS

FIG. 3 is an enlarged vertical cross section taken through lines 3—3 of the downhole seismic sensor cable of FIG. 2.

FIG. 4 is an enlarged portion of FIG. 3.

FIG. 5 is a sectional view in cross section illustrating another downhole seismic sensor cable.

DETAILED DESCRIPTION OF THE INVENTION

There are many applications that require seismic sensors to be placed below ground for the acquisition of seismic data. For example, downhole seismic sensors, such as geophones, may be used for observation purposes, such as detecting earthquakes, monitoring nuclear testing or determining fracture activity and fluid flow in the process of recovering oil and other minerals. Other uses for downhole seismic sensors include recording seismic profiling, high angle reflection profiling, detection of fluid fronts in enhanced recovery methods, delineation of stratigraphic and structural features and measurement of seismic anisotropy for the purpose of evaluating fracture description.

A specific example, the use of this invention is vertical seismic profiling, will be described. However, the invention can be used for any other purpose which requires downhole seismic sensors.

Figure 1:
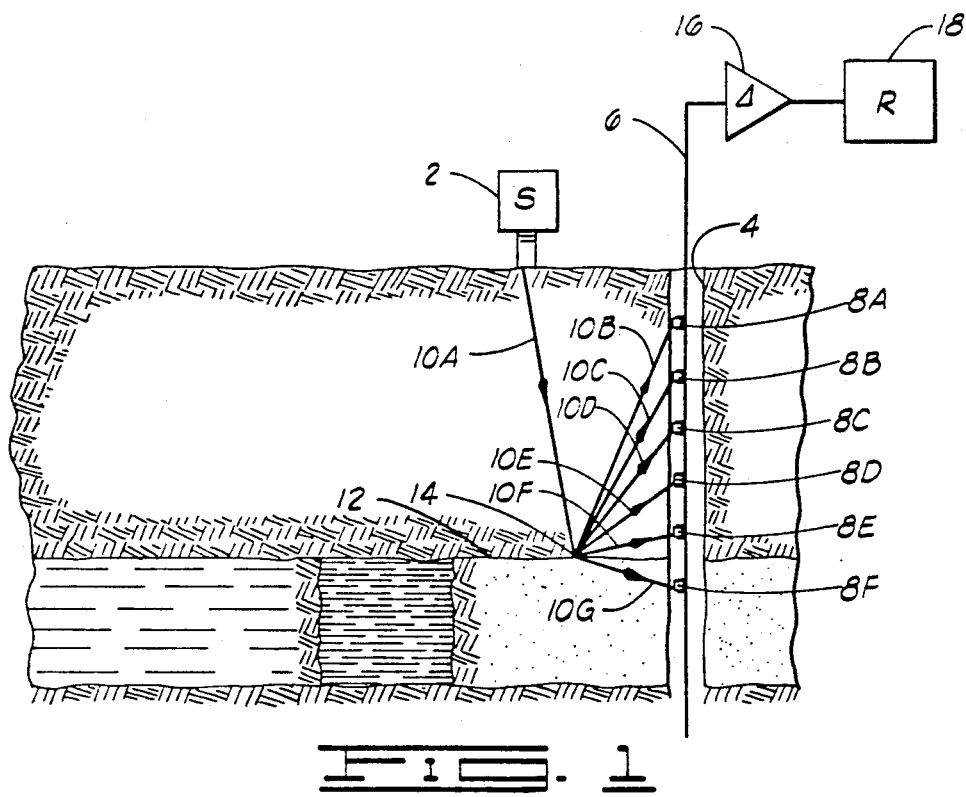
FIG. 1 is a vertical cross section extending from the surface into subterranean formations schematically illustrating a vertical seismic profiling method.

A typical vertical seismic profiling method is shown in FIG. 1. A source of seismic energy 2 is shown near the borehole 4. Sources may be of the vibrator type, and in any event must be capable of creating controlled seismic disturbances from each of a plurality of surface stations. A downhole seismic sensor cable 6, having a plurality of seismic sensors, typified by sensors 8A–8F, is positioned in one or more boreholes, such boreholes, for example, being use to recover oil from a producing reservoir or to inject a fluid into a producing reservoir or to observe underground formations penetrated thereby. Seismic sensors 8A–8F may include single or multiple sensors components (such as for example geophones) and are positioned at various intervals along the downhole seismic sensor cable 6.

The seismic sensor cable 6 is positioned down bore hole 4. Sensor 8A receives signal 10A from source 2 as 10B after refraction through the interface 12 from point 14. The remaining sensors 8B–8F receive signal 10A reflected from point 14 on interface 12 as reflected signals 10C–10G respectively.

In the preferred embodiment, the sensors 8A–8F are each composed of three geophones, one in a vertical position (not shown) and two in horizontal positions (not shown), preferably orthogonal to each other. The choice of suitable geophones depends upon the orientation of bore hole 4 with respect to the vertical and the downhole conditions, and is within the knowledge of those skilled in the art. The application of the present invention is not limited to any particular type of seismic sensor.

In some applications only a single sensor may be required, but usually there will be several sensors separated vertically along the seismic sensor cable 6 so as to be located approximately at predetermined depths down bore hole 4. The output of the sensors 8A–8F is transmitted through amplifier 16 to recorder 18. The seismic instrumentation is conventional, well known, and is used in the conventional manner.

Figure 2:
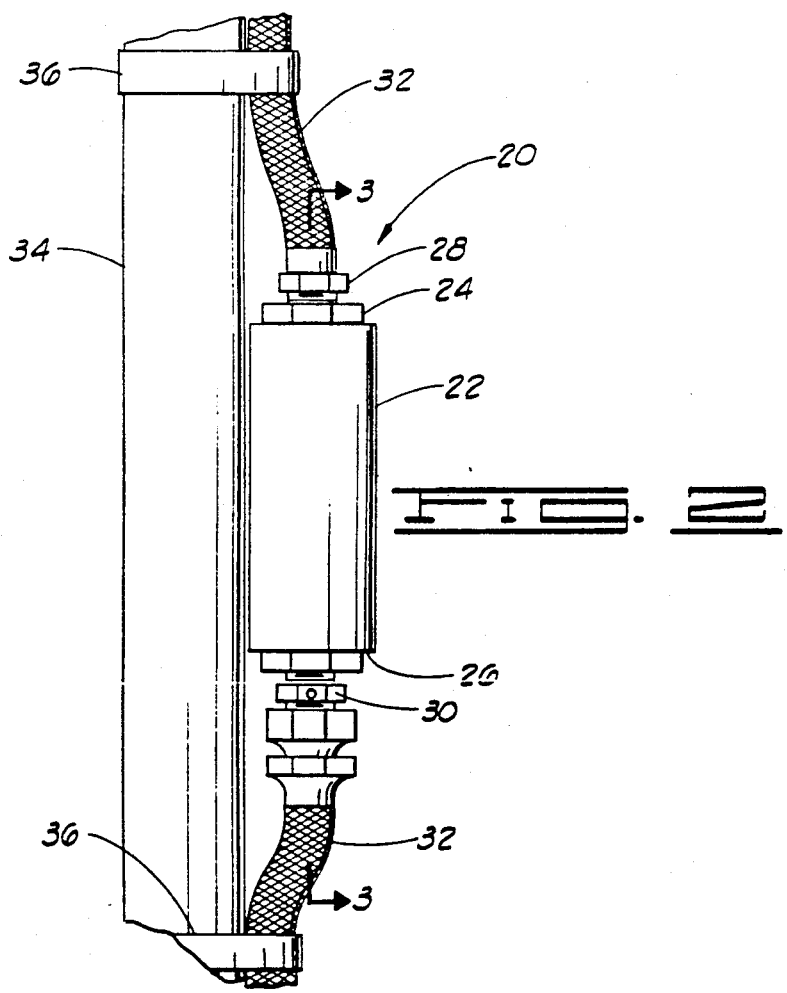
FIG. 2 is a sectional view in vertical elevational of a downhole seismic sensor cable.

Referring now to FIG. 2, a section of the downhole seismic sensor cable in accordance with the present invention is indicated generally by numeral 20. The cable 20 has a housing 22, described in greater detail below, having a first and a second end, 24 and 26 respectfully. To each end, 24 and 26 of the housing 22, coupling assemblies 28 and 30 secure sectional lengths of a tubing 32 thereto. The cable 20 is secured to a length of pipe string 34 by a pair of connectors 36 to facilitate the placement or removal of the cable 20 downhole. It is understood that the cable 20 generally includes a plurality of housings 22 secured to a plurality of sectional lengths of tubing 32 along the downhole seismic sensor cable 20 when utilizing the present invention for seismic investigation, analysis and the like.

Turning now to FIG. 3, housing 22 is preferably cylindrically shaped having portions defining an internal bore 35 sized for receiving a seismic sensor, such as a geophone. The internal bore 35 extends between ends 24 and 26 of the housing 22. Portions of the bore 35 at each end, 24 and 26, of housing 22 are threaded. Plugs 37 and 38, of the coupling assemblies 28 and 30, respectively, are threadedly secured to the respective threaded portions of the ends 24 and 26 of the housing 22. Each plug, 37 and 38, has portions defining threaded bores 40 and 42, respectively.

Coupling assembly 28 further includes a threaded male tube fitting 44, having an expanded end 46 and a threaded male end 48 and an internal bore 50 extending between ends 46 and 48 of the fitting 44. The expanded end 46 is secured to an end of one of the sectional lengths of the tubing 32 and the threaded male end 48 matingly engages threaded bore 40 of the plug 37.

Coupling assembly 30 includes a threaded male nipple 52 having an upper threaded male end 54, a lower threaded male end 56 and an internal bore 58 extending between ends 54 and 56. Threaded end 54 matingly engages threaded bore 42 of the plug 38. Threaded end 56 matingly engages threaded portions of a bore 60 of a swivel tube fitting 62 at a swivel end 64 thereof. Terminal portions 57 of the threaded end 56 of the nipple 52 are preferably smooth and inwardly flared for sealing engagement with an internal conical shoulder 65 of the swivel end 64. A fixed end 66 of the swivel tube fitting 62 is secured to an end of a sectional length of another tubing 32. Bore 60 of the swivel tube fitting 62 extends between the swivel end 64 and the fixed end 66. The nipple 52 further includes portions defining a sealable port 68 (FIG. 4) communicating with internal bore 58 for purposes discussed below.

The housing 22, the coupling assemblies 28 and 30, and the tube fittings 44 and 62 are preferably constructed of metal and more preferably constructed of stainless steel. However other metals or alloys thereof, such as copper, brass, cadmium bronze, beryllium, zinc, nickel, gold or silver can be utilized.

The tubing 32 includes a wire-braided sheath 70 overlying a corrugated hose 72. The corrugated hose 72 has an internal bore 74 extending the length thereof. The wire-braided sheath 70 provides a durable surface protecting the corrugated hose 72 from abrasion and impact.

The sheath 70 and corrugated hose 72 of the tubing 32 are preferably flexible and constructed of metal and more preferably constructed of stainless steel such as SERIES 700 ANACONDA metal hose, manufactured by Anamet Inc., Waterburg, Conn. Other metals or alloys thereof, such as copper, brass, cadmium bronze, beryllium, zinc, nickel, gold or silver can be utilized.

In accordance with the present invention, the method of making the seismic sensor cable 20 is carried out by selecting a suitable length of a jacketed cable 76, preferably a length substantially equal to the desired length of the seismic sensor cable 20 and inserting the jacketed cable 76 through internal bores 74, 50, 40, 35, 42, 58, and 60 of the aligned, unassembled respective elements previously described above and illustrated in FIGS. 2 and 3. An example of jacketed cable 76 suitable for transmitting output generated by a downhole seismic sensor is Mil-W-16878/6-BCB (Rev. E), manufactured by Harbor Industries, Chatsworth, Calif.

Referring now to FIG. 3, a length of the cable jacket of the jacketed cable 76 within the housing 22 is removed exposing a plurality of cable wires 78. Before removing the length of cable jacket, the housing 22 is positioned either above or below the length of cable jacket to be removed. Preferably, the length of cable jacket removed is approximately 2" longer than the seismic sensor connected thereto.

The cable wires 78 are twisted in the opposite direction to the directional spiral thereof causing the cable wires 78 to extend outwardly. A seismic sensor 80 is secured to the jacketed cable 76 by positioning the seismic sensor 80 between the extending cable wires 78. In this way, the seismic sensor 80 is captured or "bird caged" by cable wires 78 when tension is applied to the jacketed cable 76. The process of exposing cable wires 78 and "bird caging" seismic sensors 80 is repeated along the length of cable 76 at locations thereon corresponding to the location of each housing 22 of cable 20 selected for receiving the seismic sensor 80. Electrical connections between the cable 76 and the seismic sensor 80 are made in the conventional manner.

After securing the desired number of seismic sensors 80 to the cable 76, each seismic sensor 80 is placed within the internal bore 35 of the housing 22. The male ends of the components of each coupling assembly 28 and 30 are preferably wrapped with Teflon tape (not shown), a product of Permacel, Brunswick, New York. The male end of each coupling assembly 28 and 30 are a similarly wrapped with teflon tape. Each male end is then snugly secured within the respective threaded bore.

With continued reference to FIG. 3, upon securing coupling assemblies 28 and 30 to the housings 22 and tubings 32, a metal conduit 81 is formed, having a internal bore 82, defined by lines A—A, wherein portions of the internal bore 82 are sized for receiving the seismic sensor 80 and wherein the jacketed cable 76 is positioned within the bore 82 and extends substantially the length of the sensor cable 20.

Once assembled, sufficient quantities of an inert, temperature resistant curable material 83, preferably a silicone based material and more preferably SYLGUARD 170 a product of Dow Corning Corporation, are injected through one or more ports 68 (FIG. 4) of nipple 52 substantially filling the unoccupied spaces within the seismic sensor cable 20. In this way, once cured, material 83 couples the seismic sensor 80 to the cable 20.

Port 68 is sealed by a threaded plug 84 (FIG. 4) sealing engaging the threaded portions of the port 68. Before deployment downhole, one or more of the ports 68 may be opened and the cable 20 heated. In this way residual amounts of material 83 may be eliminating from the cable 20 through one or more open ports 68.

FIG. 5 illustrates an alternate downhole seismic sensor cable 20A. The downhole seismic sensor cable 20A is substantially similar to the downhole seismic sensor cable 20 except that seismic sensor cable 20A includes a substantially continuous flexible metallic conduit 81A.

The metallic conduit 81A includes a wire-braided sheath 70A overlying a corrugated hose 72A. The corrugated hose 72A has an internal bore 82A, illustrated by lines B-B, extending substantially the length of sensor cable 20A. The corrugated hose 72A is sized for receiving a seismic sensors 80A within the bore 82A. The sheath 70A and corrugated hose 72A of the metallic conduit 81A are preferably constructed of materials similar to those used in constructing the sheath 70 and corrugated hose 72.

The method of connecting the seismic sensor 80A to the cable wires 78A of a jacketed cable 76A are similar to the method of connecting the seismic sensor 80 to the jacket cable 76. Once the selected number of seismic sensors 80A are connected to the jacketed cable 76A, the seismic sensor cable 20A is assembled by placing the jacketed cable 76A and attached seismic sensors 80A within the bore 82A at selected positions along the corrugated hose 72A. The seismic sensors 80A are coupled to the corrugated hose 72A by substantially filling the unoccupied spaces within the corrugated hose 72A with a curable material 83A. The curable material 83A is similar the curable material 83.

The seismic sensor cable 20A may be secured to a length of pipe string (not shown) in the manner previously described for securing the seismic sensor cable 20 to the pipe string 34 (FIG. 3).

Additional advantages and modifications will be readily apparent to those skilled in the art. The invention in its broader aspects is therefore not limited to the specific details or illustrative examples shown and described. Accordingly, changes may be made in the construction, operation, and arrangement of the various parts, elements, steps and procedures described therein without departing from the spirit and scope of the invention as defined in the following claims.

What is claimed is:

1. A seismic sensor cable comprising:
    a metallic conduit having portions thereof defining an internal bore;
    at least one metallic housing integral with the metallic conduit, wherein the metallic housing has portions thereof defining a cavity sized for receiving a seismic sensor;
    a seismic sensor within the metallic housing;
    means for transmitting output generated by the seismic sensor; and
    means for securing the seismic sensor cable to a length of 2. The apparatus of claim 1 further comprising a braided metal sheath overlying the metallic conduit.

3. The apparatus of claim 1 wherein the metallic conduit is flexible.

4. The apparatus of claim 1 further comprising a plurality of metallic housings intermittently spaced along and integral with the metallic conduit.

5. The apparatus of claim 4 further comprising a seismic sensor within each metallic housing.

6. The apparatus of claim 1 wherein the internal bore of the metallic conduit extends substantially the length of the metallic conduit and communicates with the cavity of the metallic housing.

7. The apparatus of claim 1 further comprising a curable fluid substantially filling the unoccupied spaces within the geophone cable.

8. The apparatus of claim 1 wherein the metallic component of the metallic conduit and metallic housing comprises a member selected from a group consisting of stainless steel, copper, cadmium bronze, beryllium, zinc, nickel, gold, or silver.

9. A downhole seismic sensor cable comprising:
    a metallic conduit having portions thereof defining an internal bore, wherein portions of said internal bore are sized for receiving a seismic sensor;
    a seismic sensor within the metallic conduit;
    means for transmitting output generated by the seismic sensor; and
    means for securing the seismic sensor cable to a length pipe string.

10. The apparatus of claim 9 further comprising a braided metal sheath overlying the metallic conduit.

11. The apparatus of claim 9 wherein the metallic conduit is flexible.

12. The apparatus of claim 9 further comprising a curable fluid substantially filling the unoccupied spaces within the seismic sensor cable.

13. The apparatus of claim 9 wherein the metallic component of the metallic conduit comprises a member selected from a group consisting of stainless steel, copper, cadmium, bronze, beryllium, zinc, nickel, gold, or silver.

14. The apparatus of claim 1 further comprising means for coupling the seismic sensor to the seismic sensor cable.

15. The apparatus of claim 9 further comprising means for coupling the seismic sensor to the seismic sensor cable.

16. Method for obtaining seismic signals comprising the steps of:
    positioning at least one seismic sensor in a metallic conduit;
    securing the metallic conduit to a length of pipe string;
    positioning the length of pipe string below ground; and
    recording the output generated by at least one seismic sensor in response to a seismic disturbance.

17. The method of claim 16 further including the step of coupling the seismic sensor to the metallic conduit.

18. The method of claim 16 wherein the metallic conduit is flexible.

19. The method of claim 16 further including the step of transmitting the output generated by at least one seismic sensor.

20. The method of claim 16 wherein the metallic component of the metallic conduit comprises a member selected from a group consisting of stainless steel, copper, cadmium, bronze, beryllium, zinc, nickel, gold or silver.

* * * * *